Dec. 14, 1965  R. O. WALES  3,223,845
OPTICAL TRANSDUCER FOR MEASURING DISTANCE
Filed Oct. 11, 1962  2 Sheets-Sheet 1

INVENTOR.
ROGER O. WALES
BY
Joseph E. Ryan
ATTORNEY

INVENTOR.
ROGER O. WALES
BY Joseph E. Ryan
ATTORNEY

United States Patent Office 3,223,845
Patented Dec. 14, 1965

3,223,845
OPTICAL TRANSDUCER FOR MEASURING
DISTANCE
Roger O. Wales, Bloomington, Minn., assignor to Honeywell Inc., a corporation of Delaware
Filed Oct. 11, 1962, Ser. No. 229,855
3 Claims. (Cl. 250—220)

This invention relates to measurement apparatus and more particularly, to an optical type transducer designed to measure accurately relative positioning between parts on which the transducer is mounted and to provide output signals which may be used to control associated apparatus to accurateqly position the parts, such as in a machine tool. The optical type transducer of the present invention is an improvement over a portion of the apparatus shown in my copending application Serial No. 54,274, filed September 6, 1960 and entitled, "Optical Measuring Apparatus," now patent 3,197,648, issued July 27, 1965. This prior invention used a particular optical measurement arrangement suitable for measuring over very small distances and provides an analog type output which could be incorporated with other means for measuring larger units of displacement between parts and in associated machine tool type of position indicating and control apparatus. The present invention is directed to an improved optical transducer which could be used with the small unit optical measuring portion of the preceding invention to replace the mechanical means of the larger unit measurement shown therein. The present optical system for measuring larger units may be also reduced in size and utilized for measuring smaller distances but is particularly adaptable for ranges of movement from 1/10 inch on up through tens and hundreds of inches in machine tool applications. Similarly, with respect to prior optical and mechanical switching measurement systems, a dual measurement apparatus is employed with switchover between the same to eliminate ambiguity in control or output at the switchover point.

It is therefore an object of this invention to provide an improved optical transducer. Another object of this invention is to provide in an improved optical type measuring apparatus a simplified optical structure particularly adapted for use in coded measurement. Another object of this invention is to provide in an improved optical transducer a simplified arrangement for increasing light intensity and means for sharply defining the light source to improve the accuracy and operation of the same. These and other objects of this invention will become apparent from a reading of the attached description, together with the drawings, wherein:

Figure 1:
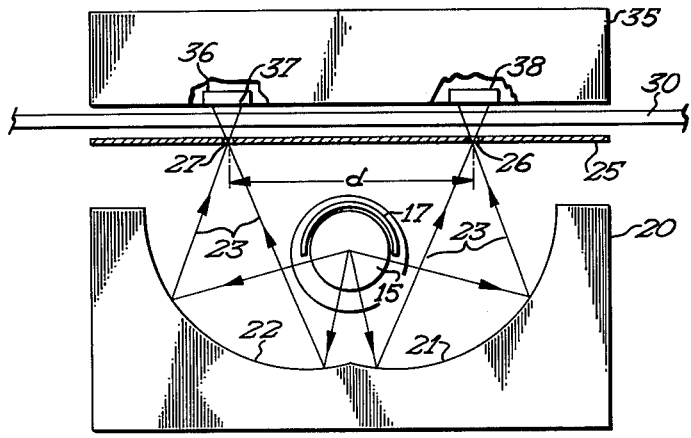
FIGURE 1 is a top view of the improved optical transducer shown schematically.

My improved optical transducer, as shown in FIGURE 1, includes a single centrally located light source or lamp indicated generally at 15, which lamp has surrounding the same a semicircular light shield 17 for the purpose of reflecting the rays from the light in a particular direction. Associated with the single light source is a double cylindrical reflector or mirror 20 positioned so that the light source is centrally located therein and the rays emanating from the source will be directed on the semi-cylindrical reflecting surfaces 21, 22 to be directed forward, as indicated by the arrows at 23 in FIGURE 1. The semicircular shield 17 concentrates the light being reflected on the mirror so that the entire intensity of the bulb is reflected from the double cylindrical surfaces 21, 22 toward a slit plate 25 having slit openings 26, 27 therein. The plate 25 or the slits 26, 27 therein concentrate the light emanating from the reflecting surfaces 21, 22 into a pair of columns of light rays for purposes to be later noted. Also, as indicated in FIGURE 1, the slits 26, 27 and slit plate or focusing plate 25 are spaced apart a predetermined distance indicated at $d$ in FIGURE 1 for the purposes to be later noted. Positioned adjacent the slit plate 25 is a code plate or elongated member 30 (best seen in FIGURE 2) having a plurality of transparent sections therein such as is indicated by 32 through which the columns of light from slits 26, 27 are directed. Adjacent the code plate 30 is a sensing block 35 having a plurality of photocells 36 therein which are spaced in rows indicated generally at 37, 38 corresponding to the spacing $d$ between the slits 26, 27. The light directed from the slits forms a node at the plate 30 to concentrate the columns of light rays therethrough and onto the photocells for maximum intensity. As will be later noted, the transparent sections 32 in the code plate or elongated element 30 are designed to correspond to a code such as a binary coded decimal. Therefore, these transparent sections are arranged in rows to represent a binary number of bits, the binary number representing a decimal number of one digit. The code plate 30 is shown in FIGURE 2 as including only sufficient binary bits for one decimal power, for example 10° and it will be understood that the element will have correspondingly several different sets of binary code patterns, not shown, each representing other decimal powers.

Figure 2:
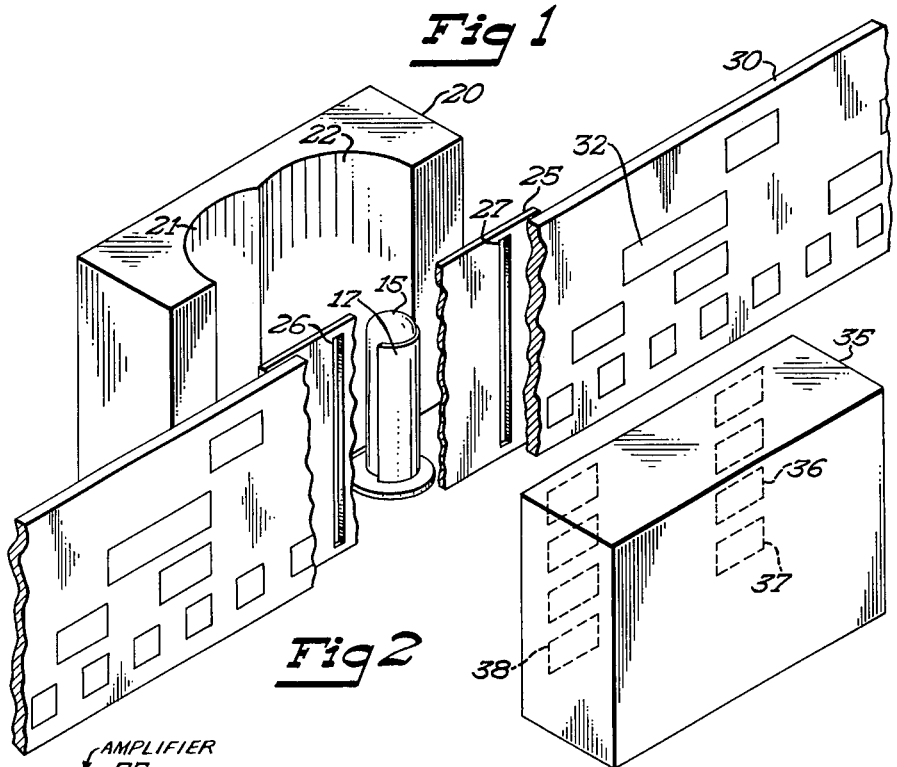
FIGURE 2 is a perspective view of the improved optical transducer showing schematically the arrangement of parts.

The perspective view in FIGURE 2 shows the relationship of parts between the reflecting block 20, the slit plate 25, the code plate or elongated element 30 with coded transparent openings therein and the photocell sensing block 35 with the photocells 36 therein. Code plate 30 is shown as a straight sheet section to fit on a bed or straight section of a machine. It should be recognized that this elongated plate may be curved or bent to fit on a rotary, curved or angularly displaced part of a machine. The light source 17 directs light onto the reflecting surfaces 21, 22 and through the slits 26, 27 to form a column of light rays for each slit being directed on the code plate, portions of which will be transmitted through the transparent openings representing the coded integers to be received by the respective photocells adjacent thereto. The rows 37, 38 of photocells 36 will be aligned with the slits so that the respective photocells corresponding to the row of coded openings in the plate 30 will receive light therefrom. While FIGURE 2 shows an arrangement of parts where light rays are directed through the code plate openings and onto the sensing block, it will be understood that the rays may be transmitted as by reflection onto a block positioned so as to sense the reflected rays.

Although not shown, it will be understood that the parts of the optical transducer will be mounted on relatively movable elements, the movement between which or the positioning between which it is desired to indicate. With respect to the component parts of the transducer, the reflecting block 20, slit plate 25, light source 17 and photocell block 35 form an assembly which is connected through means (not shown) such as being separately mounted on or through a suitable mounting bracket on one of the relatively movable parts in the alignment, as stated above. The opposite element of the transducer, that being the code plate, is adapted to be mounted on the other of the relatively movable elements in such a manner as to move therewith relative to the first named assembly. As indicated above, the code shown on the plate 30 in terms of the transparent openings or section 32 therein represents a binary coded decimal for a single decimal power. This code is repeated in sections continuously throughout the element. It will be understood that each power of a multi digit decimal number will have a separate plurality of rows of binary coded transparent openings in the elongated member 30 or code plate and a separate set of photocells 36 in a separate code block 35. Similarly, the slit plate 25 for each such power will have the distance $d$ varied, the distance $d$ representing some multiple, such as 1, of the repeatable section plus or minus one-half the length of the least significant binary bit, in terms of the coded section being read. This displacement of slits will allow the rows of photocells to be placed a convenient distance apart so that the light source with a double reflector may supply the rows simultaneously. Thus, for example, light from one slit 26 will fall on one of the transparent openings 32 in the lower code row (the least significant binary bit) shown on the code plate 30 to activate an associated photocell in row 38 in the photocell block while light from the slit 27 will fall near the corresponding opening in the next repeatable section for the lower code row, but will be displaced therefrom either one-half of the opening ahead of or behind such corresponding opening. This arrangement will prevent ambiguity since the rows of photocells in the sensing block will be selectively switched in a control circuit so that no photocells will be reading or sensing light at a point of transition between a solid portion of the plate and a transparent portion of the plate, that is during the transition from one four bit binary number to an adjacent four bit binary number.

Figure 3:
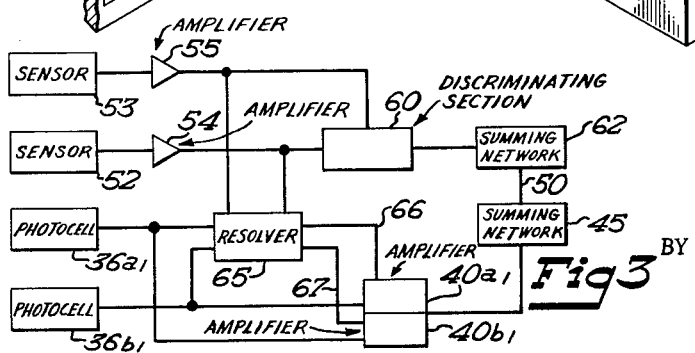
FIGURE 3 is a schematic circuit diagram of the associated measuring and control apparatus.

The apparatus for selecting which row of photocells 37 or 38, for a particular code group, is to be activated is shown in the before-mentioned application and shown schematically in FIGURE 3 in the drawings. Thus, the pair of photocells for the same code row from the photocell rows 37, 38 will be represented by the numerals $36a_1$ and $36b_1$ in FIGURE 3, these feeding amplifiers $40a_1$ and $40b_1$ leading to a summing network 45 and an output terminal 50. The lower power decimal digit will be represented by a pair of sensors 52, 53 connected through respective amplifiers 54, 55 to a discriminating section 60 and a summing network 62 leading to the output terminal 50. The outputs of the amplifier 54, 55 are connected to a resolver 65 which has selective outputs, conductors 66 and 67, indicating which half of the lower power decimal digit is presently being sensed by the preceding code rows or similar resolver apparatus such as is shown in my co-pending application, which outputs will control which of the rows of photocells 37 or 38 will be connected in circuit. This apparatus is conventional and is shown in block form for simplicity.

Figure 4:
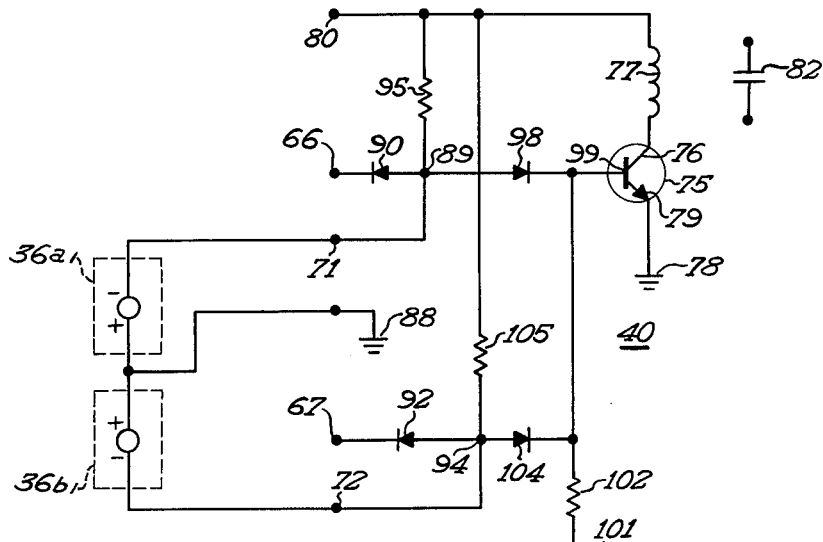
FIGURE 4 is a schematic diagram of an amplifier receiving output from the photocells of the transducer.

FIGURE 4 shows a bit amplifier 40 for one of the sets of photocells reading the corresponding row of binary code. The photocells are actually generators or batteries which, when light falls thereon, generate a current to provide an input signal to the amplifier. Thus, to correspond with the numbering in FIGURE 3, the photocells $36a_1$ and $36b_1$ are connected through diodes 90 and 92 of the resolving apparatus as well as to input terminals 71, 72 respectively of the amplifier. The amplifier 40 would form a part of the block $40a_1$, $40b_1$ shown in FIGURE 3 and basically is comprised of an NPN transistor 75 whose collector 76 is connected through a relay coil 77 to a positive source of power indicated by terminal 80. The emitter 79 is grounded as at 78. The relay coil 77 has associated therewith a normally open contact 82, the purpose of which will be defined in connection with FIGURE 5. The photocells $36a_1$ and $36b_1$ are designed to be connected into the circuit only at predetermined times, that is they will be selectively connected into the circuit of the amplifying section 40 represented by transistor 75 only when the respective photocell is not in a transition stage from one state to another. From a code standpoint this includes an "on" or light signal state, and an "off" or dark signal state of the code plate which also represent binary bits making up a portion of a coded decimal digit. Thus, one of the photocells in photocell rows 37 or 38 will be connected to control the energization of the transistor 75 while the opposite photocell in the other of the photocell rows will be disconnected. A resolver shown in block at 65 senses which half of the lower power decimal digit is being read and operates to provide an output which is a negative source, either 66 or 67, to allow one of the photocells to control while the other cannot. This negative bias source is such that a bias will be placed on the photocell not being read to prevent operation of the same. Thus, as will be seen in FIGURE 4, the photocell $36a_1$ acts as a generator being connected at one extremity to ground connection 88 and at the other extremity to the input conductor or terminal 71 leading to the input 89 of the bit amplifier. The negative bias source 66, 67 is alternately connected such that the bias will not be applied through a diode 90 to point 89 (unless $36b_1$ is being read) but in turn will be applied through a diode 92 to point 94 of the amplifier. The positive source provides a bias signal through a resistor 95 to the summing point 89 and through a diode 98 to the base 99 of the transistor 75. The base 99 also has connected thereto continuously a similar negative source indicated at 101 which is connected through a resistor 102 to the base. The photocell $36b_1$, which is connected at one extremity to the ground conductor 88 and at the other extremity to input terminal 72 leading to the point 94, supplies the base 99 of the transistor through a diode 104. This point 94 also receives a positive bias from the positive source through a resistor 105.

The values of resistors 95, 105 and 102 are such that the base 99 is positive with respect to the emitter 79 in the absence of light on the active photocell. This is the conducting state (saturation) for the NPN transistor 75 shown. Thus the polarity of the photocells $36a_1$, $36b_1$ is such that a light signal on the active photocell will cut off the transistor and return the relay to its normal state.

Figure 5:
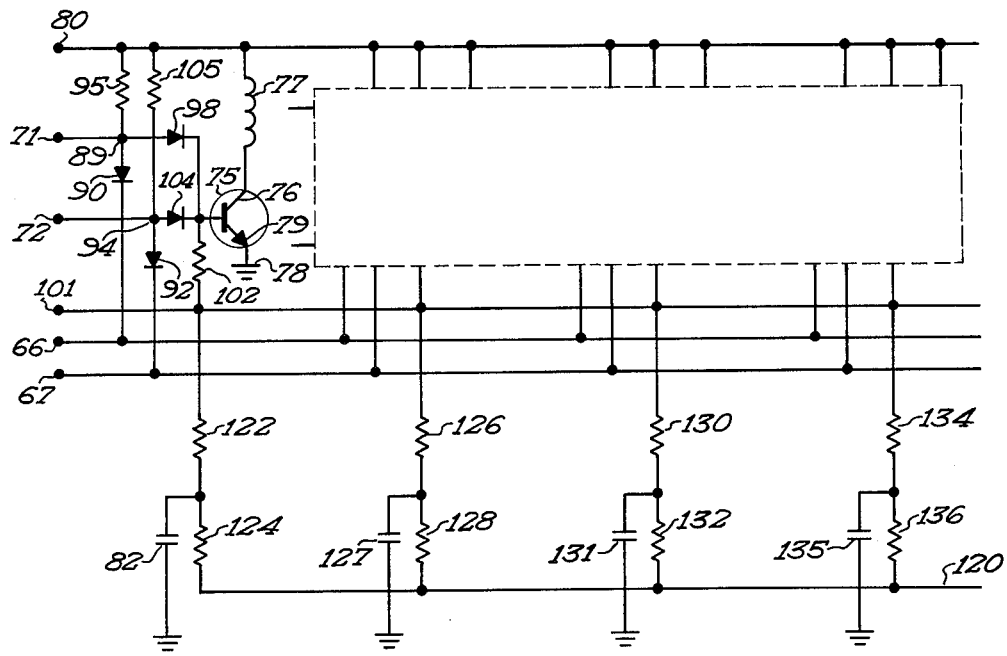
FIGURE 5 is a schematic wiring diagram of the converter of the optical transducer.

The circuit in FIGURE 5 represents a combination of the boxes $40a_1$, $40a_2$, and 45 in FIGURE 3 in that it includes the individual bit amplifiers for each of the code rows shown on the elongated element or coded plate 30 without the respective inputs from the photocells. It will be recognized that each row of photocells will apply an input from one of its cells to one of the amplifiers, only one of which is shown in FIGURE 5. The remaining amplifiers, since they are identical with the one shown, are indicated in block for simplicity. In the over-all network, the alternating negative bias supply is connected alternately to the conductors 66, 67, the same bias being applied to all the amplifiers. Similarly, the negative conductor 101 is constant for all conductors but separate input terminals from the respective photocells on each of the rows for a particular code row are required. The output of the relay 77, that is the operation of the relay contact 82, is shown in FIGURE 5 as shorting a summing resistor for each of the respective amplifiers with the total signal being summed by a summing conductor 120. Thus, for the bit amplifier associated with transistor 75 and the photocells $36a_1$ and $36b_1$, the conductor 101 for the relay 77 has connected thereto coded voltage output resistors 122, 124 connected in series and to the output conductor 120. The relay contact 82 of the relay 77 is connected across the resistor 124 and the relay is normally energized so that the connection of the midpoint to ground alters the output signal on the output conductor 120. Similarly, the amplifiers for the remaining photocells sensing the remaining rows of code for the binary integer are shown by the relay contacts 127, 131 and 135 respectively, each of which is connected to short out a portion of coded voltage producing resistors. Thus, the resistors 126, 128 in series from the conductor 101 to the summing output conductor 120 have the normally open relay contact 127 associated therewith connecting the midpoint of these resistors to ground. The coded voltage output producing resistors 130, 132 connected in series between the conductor 101 and output conductor 120 have associated therewith the normally open relay contact 131 which is connected to the midpoint of the resistors and to ground. The last bit amplifier, which is not shown but which has the normally open relay contact 135 associated therewith, controls the output from the coded resistors 134, 136 by connecting their midpoint to ground in the voltage generating circuit from conductor 101 to the output conductor 120. Thus, it will be seen that for the on-off position of the respective photocells, depending upon which of the banks is connected, a portion of these output resistors will be selectively unshorted into the summing circuit to produce an output voltage in proportion to the binary integer sensed for the position of the element 30 with respect to the remaining portion of the optical transducer. Since most of the apparatus, from a circuit standpoint, is repetitious, only a single amplifier is shown, it being understood that for each four bit code plate, representing one decimal power, there will be four such amplifiers such as shown in FIGURE 4, or a circuit as shown in FIGURE 5, and a pair of photocells for each row of the four rows of bits in the code plate. It will also be understood that, depending upon the relative positions of the slits in the code plate, the respective banks of photocells 37, 38 may be reading either an on or an off signal and that the displacement of one-half of the least significant bit apart onto the respective code being sensed permits reading other than at transition points to eliminate ambiguity. While it is not shown, it will be understood that additional code plates will be provided for each decimal power and that the same reflector means and light source may be utilized with the same spacing for the higher power or the spacing may be altered. An equivalent arrangement may be provided in the use of a double code pattern and a single light slit, with the code patterns being displaced one-half of the least significant bit apart. With this arrangement, a double row of photocells will be provided in the sensing box and the control circuitry will be the same.

In considering this invention it should be remembered that the present disclosure is intended to be illustrative only and the scope of the invention should be determined only by the appended claims.

I claim:
1. In an optical transducer, a single light source, a double cylindrical reflector mounted on one side of said light source to centrally locate said light source in said reflector to thereby produce a pair of columns of light spaced at a predetermined distance; a slit plate mounted on the other side of said light source, said slit plate having a pair of open elongated slits formed therein and spaced at said predetermined distance to thereby accept and further define said colums of light; a code plate movably mounted with respect to said columns of light and mounted in the close proximity to said slit plate on the side thereof opposite said light source, said code plate including a plurality of rows of coded light transmitting sections thereon to be illuminated by said columns of light; the sections of said code plate being repeatable and said predetermined distance being some multiple of the length of a repeatable section plus an additional length equal to one half the length of a light transmitting section of the lowest order information; a pair of columns of photoelectric sensors mounted on the side of said code plate which is opposite from said slit plate, said columns of sensors being spaced apart said predetermined distance in alignment with said columns of light; and electronic means connected to be controlled by said sensors to provide a coded output signal indicative of relative movement between said code plate and said columns of light.

2. An optical transducer in accordance with claim 1 in which said electronic means includes means for sequentially switching between one and the other of said pair of columns of photoelectric sensors to eliminate ambiguity in the transducer.

3. An optical transducer for measuring relative movement between a pair of elements, comprising: a single light source, a first small reflector mounted in close proximity to said light source on a first side thereof, a second larger reflector formed of portions of two cylinders whose individual axis are parallel and are displaced from each other, means including said second reflector mounting said second reflector on the opposite side of said light source from said first reflector to thereby gather substantially all of the light energy from said light source and to form a pair of parallel columns of light which are spaced at a predetermined distance; an elongated code plate having a code thereon comprising a plurality of elongated rows of alternate light transmitting and light blocking sections, the code on said code plate being formed as a predetermined relationship between said sections and said rows and representing a coded decimal which is continuously repeated, means mounting said code plate on said one side of said light source to illuminate the rows of sections in said code plate by said columns of light; a pair of columns of photoelectric sensors mounted on the opposite side of said code plate from said light source and spaced apart said predetermined distance, each of said columns of photoelectric sensors having an individual sensor for each of the rows of sections in said code plate, said predetermined distance between the columns of light being such that a photoelectric sensor in one column reads a part of one code section while a photoelectric sensor in the other column reads a corresponding part of an adjacent code which is displaced at least one half of said part being read; and control means connected to be controlled by said photoelectric sensors to provide an output indicative of movement between said code plate and said columns of light.

References Cited by the Examiner
UNITED STATES PATENTS

| | | | |
|---|---|---|---|
| 2,046,714 | 7/1936 | Wilson et al. | 88—14 |
| 2,570,064 | 10/1951 | Meinert | 250—220 X |
| 2,656,106 | 10/1953 | Stabler | 33—125 |
| 2,693,734 | 11/1954 | Coleman et al. | 250—219 |
| 3,023,318 | 2/1962 | Jones | 250—237 |
| 3,076,374 | 2/1963 | DeNeergaard | 88—14 |

RALPH G. NILSON, *Primary Examiner.*

JESSE D. WALL, *Assistant Examiner.*